(12) United States Patent
Radu et al.

(10) Patent No.: US 11,741,716 B2
(45) Date of Patent: Aug. 29, 2023

(54) PROCESSING ENVIRONMENTAL DATA OF AN ENVIRONMENT OF A VEHICLE

(71) Applicant: Elektrobit Automotive GmbH, Erlangen (DE)

(72) Inventors: Petru Radu, Schwalbach a. Ts. (DE); Sorin Mihai Grigorescu, Schwalbach a. Ts. (DE)

(73) Assignee: ELEKTROBIT AUTOMOTIVE GMBH, Erlangen (DE)

(*) Notice: Subject to any disclaimer, the term of this patent is extended or adjusted under 35 U.S.C. 154(b) by 776 days.

(21) Appl. No.: 16/820,998

(22) Filed: Mar. 17, 2020

(65) Prior Publication Data
US 2020/0310753 A1 Oct. 1, 2020

(30) Foreign Application Priority Data
Mar. 27, 2019 (EP) .................... 19465516

(51) Int. Cl.
| | |
|---|---|
| *G06V 20/56* | (2022.01) |
| *G01S 17/931* | (2020.01) |
| *G01J 5/02* | (2022.01) |
| *G01S 13/931* | (2020.01) |
| *G01S 15/931* | (2020.01) |
| *G05D 1/00* | (2006.01) |
| *G05D 1/02* | (2020.01) |
| *G06F 7/32* | (2006.01) |
| *G06N 3/02* | (2006.01) |

(Continued)

(52) U.S. Cl.
CPC ............ *G06V 20/56* (2022.01); *G01J 5/02* (2013.01); *G01S 13/931* (2013.01); *G01S 15/931* (2013.01); *G01S 17/931* (2020.01); *G05D 1/0088* (2013.01); *G05D 1/0214* (2013.01); *G06F 7/32* (2013.01); *G06N 3/02* (2013.01); *G06V 10/803* (2022.01); *G07C 5/085* (2013.01); *G01J 5/48* (2013.01); *G01J 2005/0077* (2013.01); *G01S 2013/93185* (2020.01); *G05D 2201/0212* (2013.01)

(58) Field of Classification Search
CPC ........ G06F 7/32; G01S 17/931; G01S 13/931; G01S 15/931; G01J 5/02; G05D 1/0088; G05D 1/0214; G06N 3/02; G07C 5/085
See application file for complete search history.

(56) References Cited

U.S. PATENT DOCUMENTS

2017/0220876 A1 8/2017 Gao et al.

FOREIGN PATENT DOCUMENTS

WO WO 2017123477 7/2017

OTHER PUBLICATIONS

Office Action dated Oct. 6, 2022 issued in European Patent Application No. 19465516.3.

(Continued)

*Primary Examiner* — Michael D Lang
(74) *Attorney, Agent, or Firm* — Cozen O'Connor

(57) ABSTRACT

A method, a computer program code, an apparatus for processing environmental data of an environment of a vehicle, a driver assistance system, which makes use of such a method or apparatus, and an autonomous or semi-autonomous vehicle comprising such a driver assistance system. Depth data of the environment of the vehicle is received from at least one depth sensor of the vehicle. Furthermore, thermal data of the environment of the vehicle is received from at least one thermal sensor of the vehicle. The depth data and the thermal data are then fused to generate fused environmental data.

14 Claims, 4 Drawing Sheets

(51) Int. Cl.
    *G07C 5/08* (2006.01)
    *G06V 10/80* (2022.01)
    *G01J 5/00* (2022.01)
    *G01J 5/48* (2022.01)

(56) References Cited

OTHER PUBLICATIONS

Tabib et al. "Efficient multi-sensor exploration using dependent observations and conditional mutual information", 2016 IEEE International Symposium On Safety, Security, and Rescue Robotics, Oct. 23, 2016, pp. 42-47.
Zweng et al. "Reliable intruder detection using combined modalities of intensity, thermal infrared and stereo depth", 2015 $12^{th}$ IEEE International Conference On Advanced Video and Signal Based Surveillance, Aug. 25, 2015, pp. 1-6.
Office Action for the corresponding European Patent Application No. 19465516.3.
Richard Grover et al., "A Low-Level Fusion of Millimetre-Wave Radar and Nightvision Imaging For Enhanced Characterisation Of A Cluttered Environment", pp. 98-103, Proceedings 2001, Australian Conference on Robotics and Automation, Sydney, Australia, Nov. 14-15, 2001.

PROCESSING ENVIRONMENTAL DATA OF AN ENVIRONMENT OF A VEHICLE

BACKGROUND OF INVENTION

1. Field of the Invention

The present invention is related to a method, a computer program code, and an apparatus for processing environmental data of an environment of a vehicle. The invention is further related to a driver assistance system, which makes use of such a method or apparatus, and to an autonomous or semi-autonomous vehicle comprising such a driver assistance system.

2. Description of Related Art

Artificial intelligence has become a mainstream technology for many future applications that require image analysis. The automotive industry has been adopting artificial intelligence gradually, mainly due to achievements made by manufacturers of low power processors, who created hardware designs specialized for particular tasks of machine learning. Deep learning architectures are employed to address the automation of feature learning from images, and have become a preferred choice of feature extraction for object detection and classification in image processing and computer vision. A specific type of deep learning neural networks, which imitate the classical convolution operation from the field of image processing, are the so-called convolutional neural networks.

Among the most employed sensors for autonomous driving tasks are radar sensors. The data received from radar sensors can be used to create a map of obstacles around the vehicle. Using artificial intelligence concepts the driving scene around the vehicle can be determined from such a map. However, although many types of radar sensors exist, their performance can be affected by poor weather conditions, such as heavy rain or heavy fog. In such conditions there is an increased risk of reading inaccurate distances.

SUMMARY OF THE INVENTION

An object of one aspect of the present invention is an improved solution for processing environmental data of an environment of a vehicle, which is suitable for coping with adverse environmental conditions.

According to a first aspect, a method for processing environmental data of an environment of a vehicle comprises:
receiving depth data of the environment of the vehicle from at least one depth sensor of the vehicle;
receiving thermal data of the environment of the vehicle from at least one thermal sensor of the vehicle; and
fusing the depth data and the thermal data to generate fused environmental data.

Similarly, a computer program code stored on a non-transient computer medium that comprises instructions, which, when executed by at least one processor, cause the at least one processor to process environmental data of an environment of a vehicle by performing the steps of:
receiving depth data of the environment of the vehicle from at least one depth sensor of the vehicle;
receiving thermal data of the environment of the vehicle from at least one thermal sensor of the vehicle; and
fusing the depth data and the thermal data to generate fused environmental data.

The term computer has to be understood broadly. In particular, it also includes electronic control units and other processor-based data processing devices.

The computer program code can, for example, be made available for electronic retrieval or stored on a computer-readable storage medium.

According to a further aspect, an apparatus for processing environmental data of an environment of a vehicle comprises:
an input for receiving depth data of the environment of the vehicle from at least one depth sensor of the vehicle and for receiving thermal data of the environment of the vehicle from at least one thermal sensor of the vehicle; and
a fusion unit for fusing the depth data and the thermal data to generate fused environmental data.

The proposed solution addresses the limitations of traditional depth sensing devices in autonomous driving by augmenting depth data with thermal data obtained from a thermal sensor. The fused data provides the information of the hottest objects in the frame and also the distance to those objects. The depth sensor may, for example, be a radar sensor, a lidar sensor, or an ultrasound sensor, whereas the thermal sensor may be a thermographic camera. Ultrasound sensors are generally employed for reverse driving operations. Over the last years, the image size that can be obtained with thermographic cameras has increased, while at the same time the price has decreased. Thermographic cameras are thus well-suited to augment the sensors that are already installed in the autonomous vehicles that are currently being used or tested on the road. By fusing depth data and thermal data highly-reliable information is generated, which is a prerequisite for reaching a higher level of autonomy, in particular level 4 or 5.

In one advantageous embodiment, an augmented occupancy grid is generated by fusing the depth data and the thermal data. The term occupancy grid is widely used in the field of autonomous driving in conjunction with depth sensors, in particular radar sensors, and indicates one way to provide a map of the space surrounding the vehicle. This map is in the form of a matrix, where the cells of the matrix are 'occupied' if the radar sensor detects an object at the respective location, or 'free' is no object is detected at the respective location. The occupancy grids created from radar scans are typically converted into grey-scale images. The pixel values of the grey-scale images may be used as input in training a convolutional neural network.

In one advantageous embodiment, the fused environmental data is provided to a neural network, e.g. a convolutional neural network. For this purpose, the augmented occupancy grid may be converted into a 2-dimensional image. A typical convolutional neural network consists of a sequence of convolutional layers, interspersed with activation functions and pooling layers, and a fully connected layer at the output of the network. The filters that are used on the first layer typically try to detect raw features, such as curves, edges or circles. As the processing moves to next layers, more complex and larger features are being employed.

Advantageously, the neural network provides a driving scene classification. For example, the driving scene classification's output is one of the following: inner city, motorway, country road, tunnel, and parking lot. Of course, other types of driving scenes may likewise be considered. The driving strategies deployed by highly autonomous driving systems are dependent on the driving context, i.e. different driving strategies are used when the ego-car is driving on a motorway, driving on a country road, driving through a tunnel, in a city, or when it is trying to park, etc. Accordingly, in order to enable a highly autonomous driving system to select an optimal driving strategy, it first needs to be aware of the context in which the vehicle is driving. The fused environmental data helps to increase the classification accuracy for the driving scene.

In one advantageous embodiment, path information is generated based on the fused environmental data. The path information may describe a trajectory that avoids cells of the augmented occupancy grid indicating a high temperature. In this way the fused data enables an emergency brake assist function of the vehicle to distinguish cold and thus non-living obstacles from hot, i.e. potentially living obstacles, also during night time or adverse weather conditions. By avoiding occupied and hot objects as a 1st priority during an emergency brake maneuver, the risk of fatalities is reduced in case a crash cannot be avoided.

In one advantageous embodiment for generating the path information, weights are assigned to the cells of the augmented occupancy grid as a function proportional to the thermal data. For example, a low value for the weight may be assigned to a hot object. A trajectory that the vehicle could follow will take the form of a queue, where cells from the grid are gradually added to the queue structure. A cell with a higher weight is the preferred choice to be added to the queue. The queue with the largest sum of weights is preferred over trajectories with a lower sum. Of course, it is likewise possible to assign a large weight to a hot object. In this case the queue with the smallest sum of weights is preferred.

Advantageously, a driver assistance system comprises an apparatus according to one aspect of the invention or is configured to perform a method according to one aspect of the invention, e.g. for selecting a driving strategy or for performing an emergency brake maneuver. Such a driver assistance system is favorably used in an autonomous or semi-autonomous vehicle. In this way it is ensured that autonomous driving is less affected by adverse environmental conditions.

BRIEF DESCRIPTION OF THE DRAWINGS

Further features of the present invention will become apparent from the following description and the appended claims in conjunction with the figures.

DETAILED DESCRIPTION OF THE PRESENTLY PREFERRED EMBODIMENTS

Figure 1:
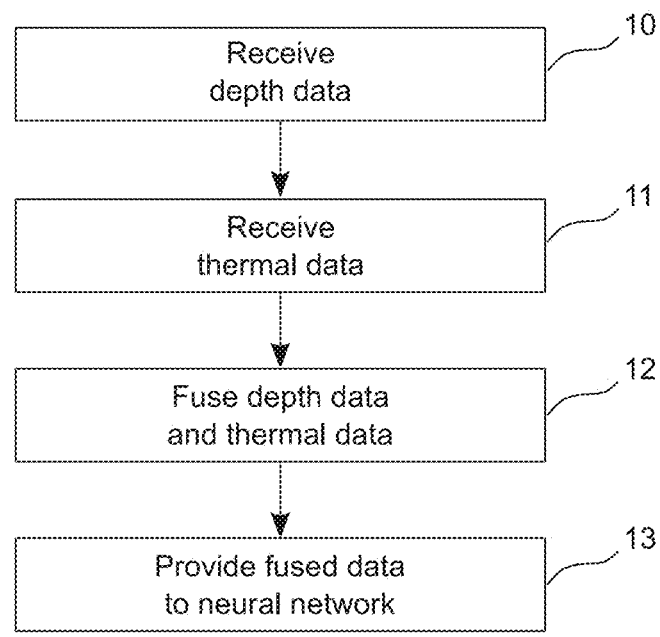
FIG. 1 schematically illustrates a method for processing environmental data of an environment of a vehicle.

The present description illustrates the principles of the present disclosure. It will thus be appreciated that those skilled in the art will be able to devise various arrangements that, although not explicitly described or shown herein, embody the principles of the disclosure.

All examples and conditional language recited herein are intended for educational purposes to aid the reader in understanding the principles of the disclosure and the concepts contributed by the inventor to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams presented herein represent conceptual views of illustrative circuitry embodying the principles of the disclosure.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a combination of circuit elements that performs that function or software in any form, including, therefore, firmware, microcode, or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

FIG. 1 schematically illustrates a method for processing environmental data of an environment of a vehicle. In a first step, depth data of the environment of the vehicle are received 10 from at least one depth sensor of the vehicle, e.g. from a radar sensor, a lidar sensor, or an ultrasound sensor. Furthermore, thermal data of the environment of the vehicle are received 11 from at least one thermal sensor of the vehicle, e.g. from a thermographic camera. The depth data and the thermal data are then fused 12 to generate fused environmental data. For example, an augmented occupancy grid may be generated by fusing 12 the depth data and the thermal data. The fusion may be performed by first performing an image registration, resulting in a 2-channel structure, one channel for the depth data DD and one channel for the thermal data TD. Each channel is a 2-dimensional image.

The two channels may then be fused into one channel Finally, the fused environmental data are provided 12 to a neural network. Based on the fused environmental data the neural network may provide a driving scene classification label. By way of example, the driving scene classification output may be one of inner city, motorway, country road, tunnel, and parking lot. Furthermore, path information may be generated based on the fused environmental data. The path information preferably describes a trajectory that avoids cells of the augmented occupancy grid indicating a high temperature. For this purpose, weights may be assigned to the cells of the augmented occupancy grid as a function of the thermal data. The path information may be used as a basis for performing an emergency brake maneuver.

Figure 2:
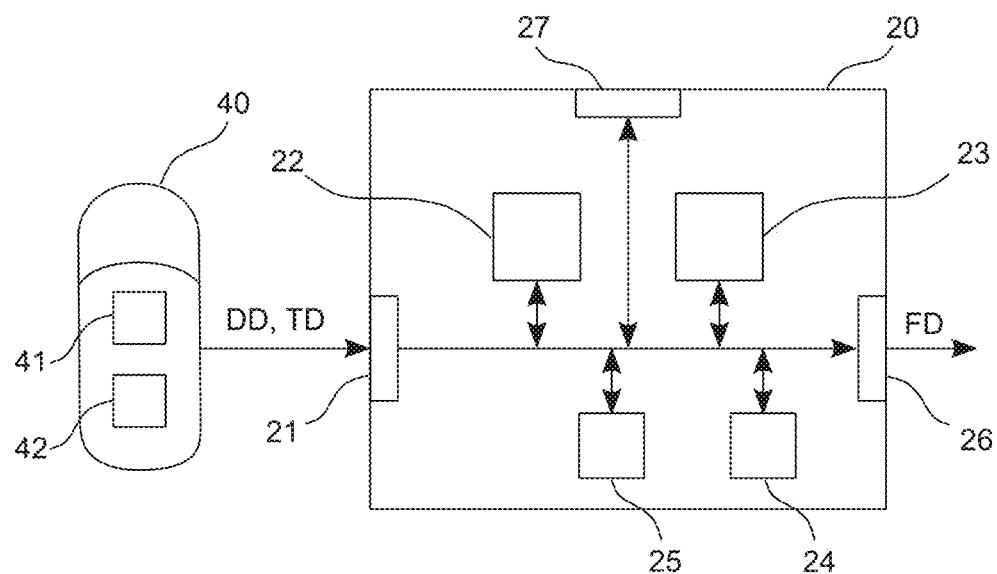
FIG. 2 schematically illustrates a first embodiment of an apparatus for processing environmental data of an environment of a vehicle.

FIG. 2 schematically illustrates a block diagram of an apparatus 20 for processing environmental data of an environment of a vehicle 40. The apparatus 20 has an input 21 for receiving depth data DD of the environment of the vehicle 40 from at least one depth sensor 41 of the vehicle 40 and for receiving thermal data TD of the environment of the vehicle 40 from at least one thermal sensor 42 of the vehicle 40. For example, the depth sensor 41 may be a radar sensor, a lidar sensor, or an ultrasound sensor, whereas the thermal sensor 42 may be a thermographic camera. A preprocessing unit 22 may apply preprocessing operations to the depth data DD or the thermal data TD, e.g. by performing an image registration. The apparatus 20 further has a fusion unit 23 for fusing the depth data DD and the thermal data TD to generate fused environmental data FD. For example, an augmented occupancy grid may be generated by fusing the depth data DD and the thermal data TD. The fusion may be performed by first performing an image registration, resulting in a 2-channel structure, one channel for the depth data DD and one channel for the thermal data TD. Each channel is a 2-dimensional image. The two channels may then be fused into one channel Data generated by the apparatus 20 can be stored in a local storage unit 25 or made available for further processing via an output 26. The output 26 may also be combined with the input 21 into a single bidirectional interface. Advantageously, the fused environmental data FD are provided to a neural network. Based on the fused environmental data FD the neural network may provide a driving scene classification. By way of example, the driving scene classification may be one of inner city, motorway, country road, tunnel, and parking lot. Furthermore, path information may be generated based on the fused environmental data FD. The path information preferably describes a trajectory that avoids cells of the augmented occupancy grid indicating a high temperature. For this purpose, weights may be assigned to the cells of the augmented occupancy grid as a function of the thermal data. The path information may be used as a basis for performing an emergency brake maneuver.

The preprocessing unit 22 and the fusion unit 23 may be controlled by a controller 24. A user interface 27 may be provided for enabling a user to modify settings of the preprocessing unit 22, the fusion unit 23, or the controller 24. The preprocessing unit 22, the fusion unit 23, and the controller 24 can be embodied as dedicated hardware units. Of course, they may likewise be fully or partially combined into a single unit or implemented as software running on a processor.

Figure 3:
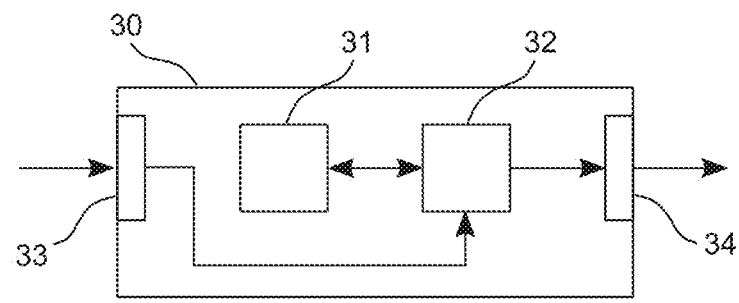
FIG. 3 schematically illustrates a second embodiment of an apparatus for processing environmental data of an environment of a vehicle.

A block diagram of a second embodiment of an apparatus 30 for processing environmental data of an environment of a vehicle is illustrated in FIG. 3. The apparatus 30 comprises a processing device 31 and a memory device 32. For example, the apparatus 30 may be a computer or an electronic control unit. The memory device 32 has stored instructions that, when executed by the processing device 31, cause the apparatus 30 to perform steps according to one of the described methods. The instructions stored in the memory device 32 thus tangibly embody a program of instructions executable by the processing device 31 to perform program steps as described herein according to the present principles. The apparatus 30 has an input 33 for receiving data. Data generated by the processing device 31 are made available via an output 34. In addition, such data may be stored in the memory device 32. The input 33 and the output 34 may be combined into a single bidirectional interface.

The processing device 31 as used herein may include one or more processing units, such as microprocessors, digital signal processors, or a combination thereof.

The local storage unit 25 and the memory device 32 may include volatile and/or non-volatile memory regions and storage devices such as hard disk drives, optical drives, and/or solid-state memories.

Figure 5:
FIG. 5 depicts a road scene acquired with a thermographic camera.

In the following, a more detailed description of the present approach towards processing environmental data of an environment of a vehicle shall be given with reference to FIG. 4 to FIG. 6. In this description, the depth data stems from a radar sensor. Of course, also other types of sensors can be used to obtain depth data.

The basic idea behind occupancy grids is the division of the environment into 2D cells, where each cell represents the probability, or belief, of occupation. For autonomous driving, sonar, lidar, and radar sensory data can be used to model the uncertainty of obstacles measurements and to derive the occupancy belief. A belief is assigned to every cell which intersects the ray of a range measurement. This information is then accumulated over time and fused into a single grid. Initially, a grid cell is considered to represent free space and the content of the grid layer gets degraded over time by gradually decreasing the occupancy information. The grid content is updated over and over again, in real-time, with each sensory measurement.

Figure 4A:
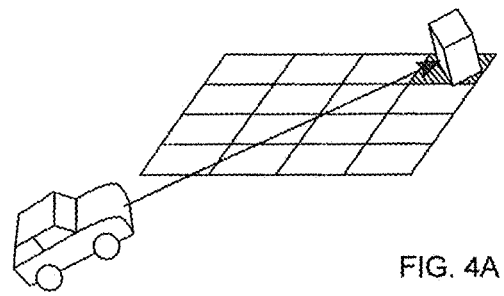
FIGS. 4A-4C illustrate an example of the behavior of a grid occupancy algorithm.
Figure 4B:
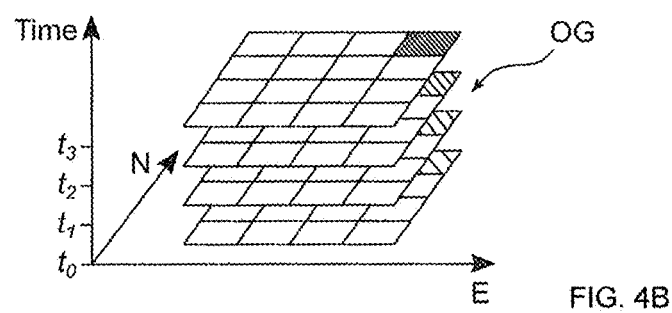
Figure 4C:
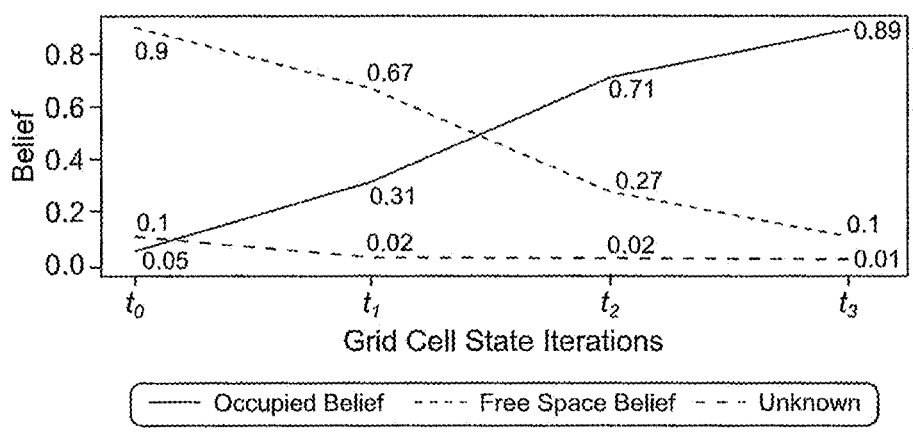

A pedagogical example of the behavior of a grid occupancy algorithm is illustrated in FIGS. 4A-4C, where an ego-car encounters an obstacle when driving on the North-East (NE) direction. FIG. 4) illustrates the underlying measurement, FIG. 4) shows examples of computed occupancy grids OG, FIG. 4) indicates the corresponding numerical values of the belief evolution. Cells with a large hatch density represent the occupied space, while the free space is marked with a small hatch density. The hatch density thus represents the degree of occupancy. The smaller the hatch density is, the higher is the probability of a cell to be free.

The occupancy grid computed with the above-described method is first converted into an image representation, where each grid cell is coded as an image pixel. Pixels with a first colour intensity value represent obstacles; free space is coded with a second colour intensity value, while unknown states may be represented in black. The higher a pixel intensity towards a specific colour code is, the higher the occupancy confidence is.

A thermographic camera detects infrared radiation, or heat, that is invisible to the human eye. The frequency band of infrared radiation ranges from 0.3 THz to 385 THz. The infrared sensor constructs a thermogram, which is basically a temperature pattern. The data from the thermogram is subsequently converted into electrical signals and sent to a processing unit in the camera. The processing unit converts the raw data of the thermogram into visual signals, which are then shown on a display screen. FIG. 5 depicts a road scene acquired with a thermographic camera. In this figure a grey-scale version of the resulting image is shown. It is readily apparent from the figure that a pedestrian 60 can be recognized due to the difference in color representation of hot objects.

According to the present principles, the radar image data are used to augment the temperature data by incorporating the depth information, i.e. information indicating at what distance the hot/cold objects are situated in the driving scene. The fused information can then be provided to autonomous driving functions, such as an emergency brake assist function. The fused information can be used by the autonomous driving functions in a variety of scenarios. For example, the effects of a crash that cannot be avoided but can be reduced by steering the car towards objects that are not hot. This helps to minimize potential fatalities.

Figure 6:
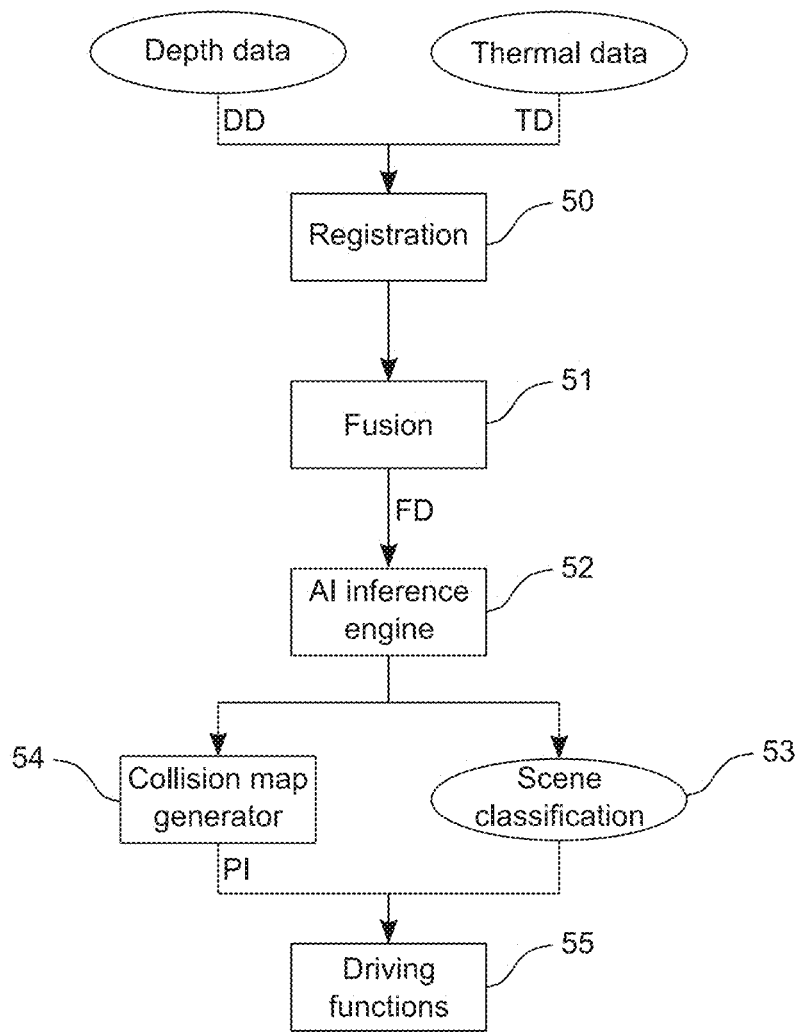
FIG. 6 shows a system architecture of the proposed data processing mechanism.

The system architecture of the proposed data processing mechanism is shown in FIG. 6. Depth data DD originating from a radar sensor as well as thermal data TD originating from a thermal sensor are provided to an image registration block 50. For example, the depth data are provided in the form of an occupancy grid. The purpose of the image registration block 50 is to match pixels in the occupancy grid as closely as possible with pixels in the thermal image belonging to the corresponding objects. A fusion block 51 performs image data formatting so that a depth image is generated. The depth image may be generated by augmenting the occupancy grid with the thermal data TD and converting the augmented occupancy grid into an image that resembles a disparity map. Generally speaking, a disparity map is a 2D image generated by a stereo camera, which has lighter colors for objects that are close to the stereo camera and darker colors for objects that are farther away from the stereo camera. Similarly, the pixels of the occupancy grid that correspond to "occupied cells" AND "hot" objects will have a very light color. The pixels of the occupancy grid that correspond to "free cells" AND "hot" objects will typically be far away, e.g. people inside a house, and have a medium-dark color. The pixels corresponding to "occupied cells" AND "cold" objects will have medium-light colors. Finally, the pixels corresponding to "free cells" AND "cold" objects will have dark colors. The resulting fused data FD are provided to an artificial intelligence inference engine 52. The artificial intelligence inference engine 52 is realized using a deep learning architecture, such as a convolutional neural network. Various architectures of deep neural networks can be trained and fine-tuned for increasing the accuracy of the proposed approach. The choice of the network architecture may be decided based on weather information or the time of the day or night, so that an adaptive and dynamic model is created.

One output of the artificial intelligence inference engine 52 is a scene classification result 53, which provides data about the driving context. For example, based on the fused data FD a discrimination can be made between inner city, motorway, and parking lot. Such a discrimination is useful as highly autonomous driving systems typically deploy different driving strategies when the ego-car is driving on a motorway, driving on a country road, driving through a tunnel, driving in the inner city, or when it is trying to park. For example, if the car is on the motorway at high speeds, the autonomous driving functions are not allowed to steer aggressively, as the car could lose stability and roll over.

The output of the artificial intelligence inference engine 52 can further be used by a collision map generator 54, which creates additional path information PI for minimizing collisions with objects that are hot. Considering the above described depth image, the path created by the collision map generator 54 is the "darkest path" forward. To this end, different weights may be assigned to different cells of the augmented occupancy grid. For example, a low value for the weight may be assigned to a hot object. A trajectory that the car could follow will take the form of a queue, where cells from the grid are gradually added to the queue structure. A cell with a higher weight is the preferred choice to be added to the queue. The queue with the largest sum of weights is preferred over trajectories with a lower sum. Of course, it is likewise possible to assign a large weight to a hot object. In this case the queue with the smallest sum of weights is preferred. The collision map generator 54 keeps the path continuously updated during driving.

The scene classification result 53 and the additional path information PI generated by the collision map generator 54 may be provided to a variety of autonomous driving functions 55, e.g. for selecting a driving strategy or for performing an emergency brake maneuver.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for processing environmental data of an environment of a vehicle, comprising:
   receiving depth data of the environment of the vehicle from at least one depth sensor of the vehicle;
   receiving thermal data of the environment of the vehicle from at least one thermal sensor of the vehicle;
   merging the depth data and the thermal data to generate merged environmental data; and
   generating an augmented occupancy grid by the merging of the depth data and the thermal data distinguishing hot and cold objects.

2. The method according to claim 1, wherein fusing comprises:
   performing an image registration that results in a 2-channel structure, a first channel for the depth data and a second channel for the thermal data, where each channel is a 2-dimensional image.

3. The method according to claim 1, further comprising:
   providing the merged environmental data to a neural network.

4. The method according to claim 3, wherein the neural network provides a driving scene classification.

5. The method according to claim 4, wherein the driving scene classification is one of inner city, motorway, country road, tunnel, and parking lot.

6. The method according to claim 1, further comprising:
   generating path information based at least in part on the merged environmental data.

7. The method according to claim 6, wherein the path information describes a trajectory that avoids cells of the augmented occupancy grid indicating a high temperature.

8. The method according to claim 1, wherein the at least one depth sensor of the vehicle is a radar sensor, a lidar sensor, or an ultrasound sensor.

9. The method according to claim 1, wherein the at least one thermal sensor of the vehicle is a thermographic camera.

10. A method for processing environmental data of an environment of a vehicle, comprising:
   receiving depth data of the environment of the vehicle from at least one depth sensor of the vehicle;
   receiving thermal data of the environment of the vehicle from at least one thermal sensor of the vehicle;
   merging the depth data and the thermal data to generate merged environmental data;
   generating an augmented occupancy grid is generated by the merging of the depth data and the thermal data;
   generating path information based at least in part on the merged environmental data; and
   assigning weights for the generating of the path information to respective cells of the augmented occupancy grid as a function proportional to the thermal data,
   wherein the path information describes a trajectory that avoids cells of the augmented occupancy grid indicating a high temperature.

11. A computer program code stored on a non-transient computer readable media comprising instructions, which, when executed by at least one processor, cause the at least one processor to:
   receive depth data of an environment of a vehicle from at least one depth sensor of the vehicle;
   receive thermal data of the environment of the vehicle from at least one thermal sensor of the vehicle;
   merge the depth data and the thermal data to generate merged environmental data; and
   generate an augmented occupancy grid by the merging of the depth data and the thermal data distinguishing hot and cold objects.

12. An apparatus for processing environmental data of an environment of a vehicle, the apparatus comprising:
   at least one input for receiving depth data of the environment of the vehicle from at least one depth sensor of the vehicle and for receiving thermal data of the environment of the vehicle from at least one thermal sensor of the vehicle;
   a merging unit configured to merge the depth data and the thermal data to generate merged environmental data; and
   generating an augmented occupancy grid by the merging of the depth data and the thermal data distinguishing hot and cold objects.

13. A driver assistance system comprising an apparatus configured to environmental data of an environment of a vehicle, comprising:
   at least one input for receiving depth data of the environment of the vehicle from at least one depth sensor of the vehicle and for receiving thermal data of the environment of the vehicle from at least one thermal sensor of the vehicle;
   a merging unit configured to merge the depth data and the thermal data to generate merged environmental data; and
   generating an augmented occupancy grid by the merging of the depth data and the thermal data distinguishing hot and cold objects.

14. An autonomous or semi-autonomous vehicle comprising:
   a driver assistance system comprising an apparatus configured to environmental data of an environment of a vehicle, comprising:
      at least one input for receiving depth data of the environment of the vehicle from at least one depth sensor of the vehicle and for receiving thermal data of the environment of the vehicle from at least one thermal sensor of the vehicle;
      a merging unit configured to merge the depth data and the thermal data to generate merged environmental data; and
      generating an augmented occupancy grid by the merging of the depth data and the thermal data distinguishing hot and cold objects.

* * * * *